April 16, 1929.　　　H. H. AVERY　　　1,708,997
BEARING
Filed Jan. 12, 1928
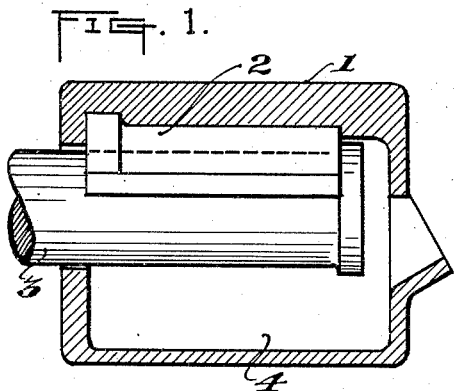
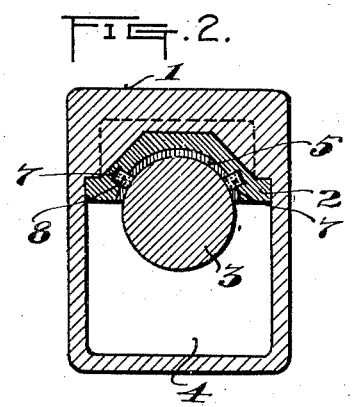
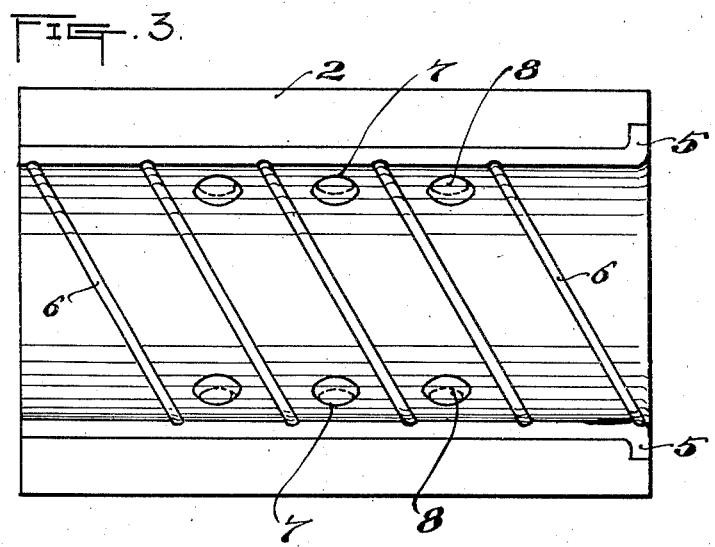

Patented Apr. 16, 1929.

1,708,997

UNITED STATES PATENT OFFICE.

HARRY HOWARD AVERY, OF LETHBRIDGE, ALBERTA, CANADA, ASSIGNOR OF ONE-TENTH TO OTTO KIRSTEIN, OF GLEICHEN, ALBERTA, CANADA.

BEARING.

Application filed January 12, 1928, Serial No. 246,254, and in Canada July 18, 1927.

My invention relates to improvements in bearings, and the objects of my invention are, first, to provide a means of spreading the lubricant over the whole area of the bearing contact, and second, to provide a second supply of lubricant which shall be released when the bearing heats, due either to the failure of the natural supply of lubricant or from other causes.

I attain these objects by the mechanism illustrated in the accompanying drawings, in which—

Fig. 1 is a part section and part elevation of a journal in its bearing;

Fig. 2 is a cross section through the same;

Fig. 3 is an enlarged elevation of the bearing proper looking towards the bearing surface.

Similar numerals refer to similar parts throughout the several views:

Referring to the drawings:

1 represents a housing or support for the bearing, and which in railway cars and the like is usually carried on the spring gear. 2 is the bearing shell which has formed thereon suitable lugs and flanges adapted to intimately engage with the interior shape of the housing 1. 3 is a journal the surface of which bears upon a suitable antifriction lining 5 which is supported by the bearing shell 2. 7, 7 are recesses formed in the bearing surface and passing through the antifriction lining 5 into the bearing shell 2. The recesses may be of any number and the sides of same are grooved or simply threaded with a coarse screw thread for the purpose of better holding the lubricant plugs 8. These plugs of lubricant 8, I compound from various greases or combinations of grease and wax and other lubricating materials, so proportioning the mixture that the melting point will be above the normal running temperature of the bearing under consideration, and yet be below the temperature at which the bearing will score or the antifriction metal will melt.

While many combinations of different materials will give the results desired, one combination which I use, comprises a bearing metal of copper 84% : tin 13% : zinc 3% : and a lubricant consisting of petroleum oil 53.75% : insoluble metallic soaps of aluminum base 45.67% : and moisture .58%. It is understood that variations in the composition of the bearing metal will necessitate further variations in the composition of the lubricant, so that I do not wish to confine my application to the exact composition mentioned.

Under normal running conditions the supply of lubricant is contained in the lower part 4 of the housing 1 which space is commonly partly filled with oil saturated waste. The oil is fed upward by the rotation of the journal 3 and part of same passes along the oil grooves 6 which are cut spirally in the antifriction metal 5. The journal bearing surface is therefor exposed throughout its length to a supply of lubricant either directly from contact with the main supply or through contact with the oil in the oil grooves. If from any cause the bearing heats beyond the melting point of the plugs 8 a further supply of lubricant is immediately available which will probably be sufficient to carry the bearing until it is inspected.

I have illustrated my invention in its simplest form where it is adapted to the journal of a railway car or the like. I however contemplate other adaptations of the bearing such as for shafting, etc., where two bearing shells are carried by the housing in opposite relationship, each shell having its antifriction metal lining complete with spiral grooves and inserted plugs of lubricant.

I am aware that prior to my invention bearings have been used with antifriction metal linings having oil grooves therein. I therefore do not claim such a combination broadly, but what I do claim, and desire to secure by Letters Patent, is—

1. In combination with a bearing, recesses in the bearing surface, the said recesses containing a lubricant material having a melting point intermediate the normal running temperature of the said bearing and a temperature destructive to same.

2. In combination with a bearing, spiral oil grooves formed in the bearing surface, recesses in the bearing surface containing a lubricant having a melting point intermediate the normal running temperature of the said bearing and a temperature destructive to same.

3. A bearing comprising a housing adapted to contain lubricant, an antifriction metal liner supported in the said housing adapted to engage a journal, spiral oil grooves formed in the antifriction metal liner, recesses formed in the bearing surface containing a lubricant having a melting point intermediate the normal running temperature of the said bearing and a temperature destructive to same.

4. A bearing comprising a housing adapted to contain lubricant, a bearing shell supported in the said housing having an antifriction metal facing adapted to engage a journal, oil grooves formed in the antifriction metal facing adapted to spread the lubricant over the bearing contact, recesses formed in the bearing surface, plugs of lubricating material adapted to fill the said recesses the said plugs having a melting point intermediate the normal running temperature of the bearing and a temperature destructive to same.

HARRY HOWARD AVERY.